(12) United States Patent
Semmelrodt

(10) Patent No.: US 9,234,910 B2
(45) Date of Patent: Jan. 12, 2016

(54) METHOD AND DEVICE FOR DETERMINING A STATE OF MOTION OF A VEHICLE COMPRISING AN ACCELERATION SENSOR

(75) Inventor: Sven Semmelrodt, Bösingen (DE)

(73) Assignee: Continental Automotive GmbH, Hannover (DE)

( * ) Notice: Subject to any disclaimer, the term of this patent is extended or adjusted under 35 U.S.C. 154(b) by 321 days.

(21) Appl. No.: 13/060,349

(22) PCT Filed: Aug. 21, 2009

(86) PCT No.: PCT/EP2009/060832
§ 371 (c)(1),
(2), (4) Date: Feb. 23, 2011

(87) PCT Pub. No.: WO2010/023165
PCT Pub. Date: Mar. 4, 2010

(65) Prior Publication Data
US 2011/0161043 A1    Jun. 30, 2011

(30) Foreign Application Priority Data
Aug. 25, 2008 (DE) .......................... 10 2008 039 613

(51) Int. Cl.
*G01P 13/00* (2006.01)

(52) U.S. Cl.
CPC ....................... *G01P 13/00* (2013.01)

(58) Field of Classification Search
CPC ........................................................ G01P 13/00
USPC ......................................................... 702/141
See application file for complete search history.

(56) References Cited

U.S. PATENT DOCUMENTS

| | | | |
|---|---|---|---|
| 4,752,053 A * | 6/1988 | Boetzkes | 246/167 R |
| 5,736,923 A | 4/1998 | Saab | |
| 6,087,950 A * | 7/2000 | Capan | 340/665 |
| 6,147,626 A | 11/2000 | Sakakibara | |
| 6,411,868 B2 | 6/2002 | Tiede et al. | |
| 6,829,525 B2 | 12/2004 | Tanaka et al. | |
| 7,116,095 B2 * | 10/2006 | Takizawa et al. | 324/174 |
| 7,310,593 B2 | 12/2007 | Hammerschmidt | |
| 7,402,449 B2 * | 7/2008 | Fukuda et al. | 438/53 |
| 2001/0044685 A1 * | 11/2001 | Schubert | 701/50 |
| 2003/0236607 A1 | 12/2003 | Tanaka et al. | |
| 2006/0155456 A1 * | 7/2006 | Kakuda et al. | 701/70 |

FOREIGN PATENT DOCUMENTS

| | | |
|---|---|---|
| DE | 199 37 689 A1 | 3/2000 |
| DE | 100 10 607 A1 | 9/2001 |
| DE | 10 2004 010 665 A1 | 9/2005 |
| EP | 0 753 752 | 1/1997 |
| EP | 1 357 354 | 10/2003 |
| EP | 1 681 573 | 7/2006 |
| JP | 10 078446 | 3/1998 |

* cited by examiner

*Primary Examiner* — John Breene
*Assistant Examiner* — Terence Stifter, Jr.
(74) *Attorney, Agent, or Firm* — Cozen O'Connor

(57) ABSTRACT

To determine a state of motion of a vehicle comprising an acceleration sensor, a vibration signal is determined as a function of a measurement signal of the acceleration sensor. The vibration signal is representative of vibrations of the vehicle. A determination is made as to whether the vehicle is at a standstill or whether the vehicle is moving, such determination made by comparing the vibration signal with at least one pre-determined threshold value.

10 Claims, 4 Drawing Sheets

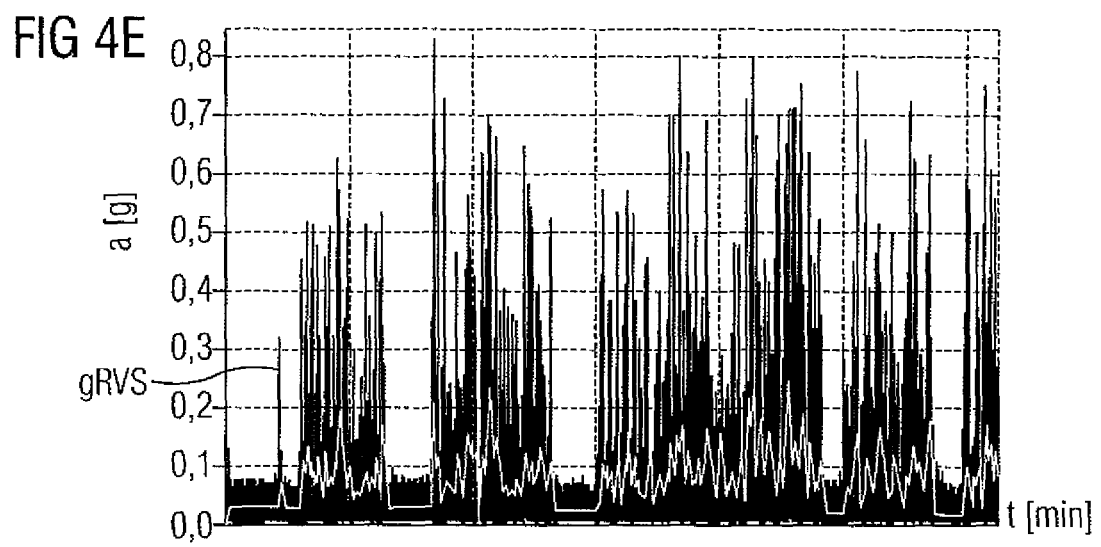
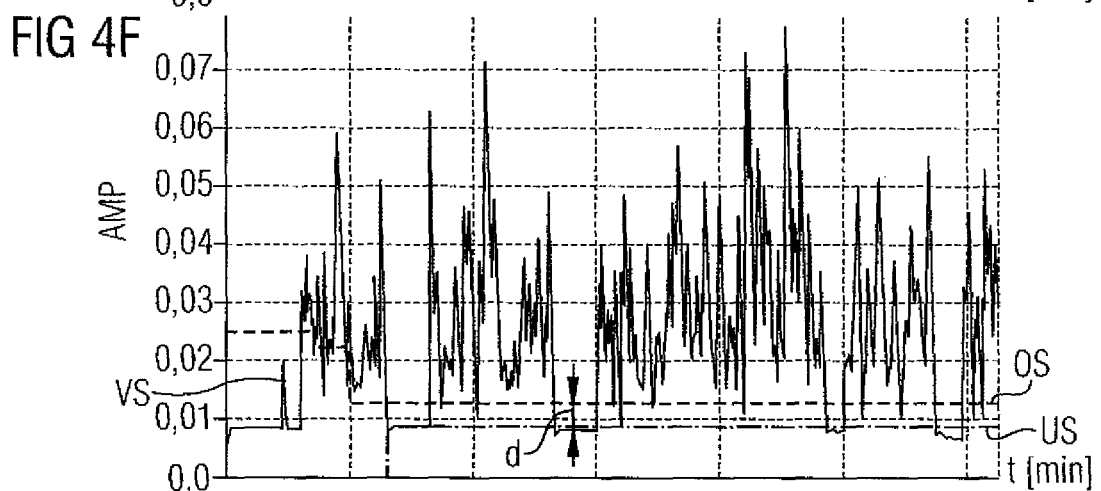
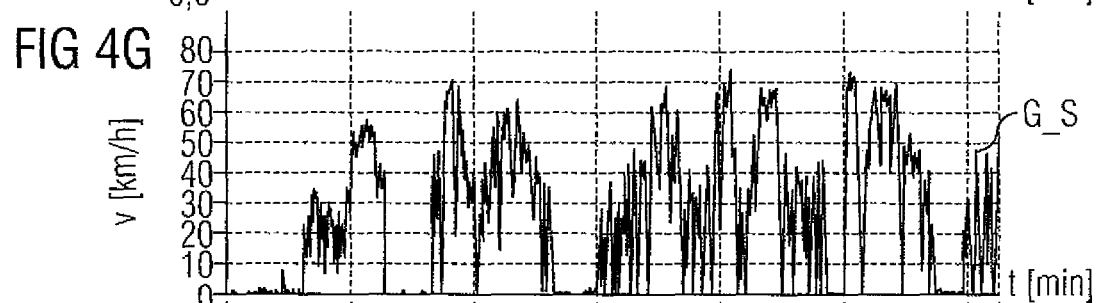
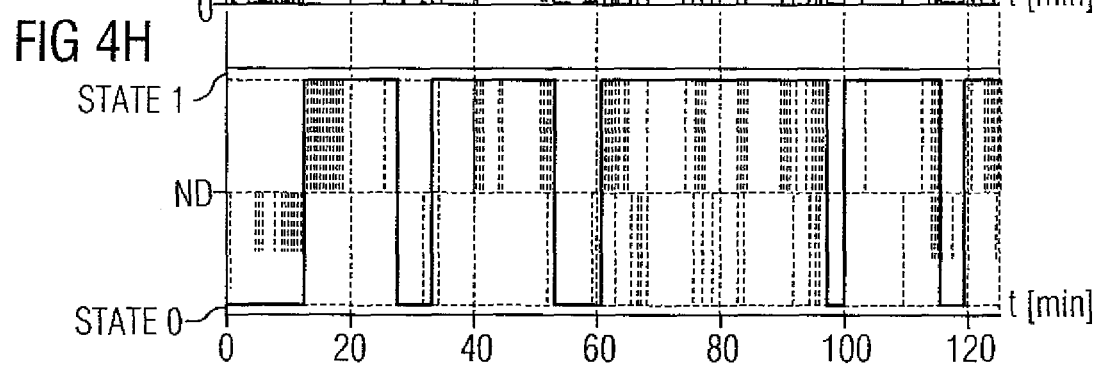

METHOD AND DEVICE FOR DETERMINING A STATE OF MOTION OF A VEHICLE COMPRISING AN ACCELERATION SENSOR

PRIORITY CLAIM

This is a U.S. national stage of Application No. PCT/EP2009/060832, filed on Aug. 21, 2009, which claims priority to German Application No: 10 2008 039 613.3, filed: Aug. 25, 2008, the contents of which are incorporated herein by reference.

BACKGROUND OF THE INVENTION

Field of the Invention

Due to the continually increasing density of vehicle traffic on roads, both precise traffic control technology and individual billing for the roads that are respectively used are becoming necessary on a more and more frequent basis. Accurate knowledge of dynamic vehicle data is an essential precondition both for traffic control technology and for the individual billing for the roads that are used, for example by toll systems. In particular, for toll systems it is important to be able to determine the required dynamic vehicle data in a way which is both failure-proof and tamper-proof. A minimum requirement of dynamic vehicle data in this context is knowledge as to whether the vehicle is moving or whether the vehicle is stationary.

SUMMARY OF THE INVENTION

An object on which one embodiment of the invention is based is to provide a method and a device with which a state of motion of a vehicle can be reliably determined.

One embodiment of the invention is defined by a method and a corresponding device for determining a state of motion of a vehicle with an acceleration sensor. A vibration signal, which is representative of vibrations of the vehicle, is determined as a function of a measurement signal of the acceleration sensor. As a function of a comparison of the vibration signal with at least one predefined threshold value it is determined whether the vehicle is stationary or whether the vehicle is moving. This permits reliable and cost-effective determination of the state of motion of the vehicle as a function of just one acceleration sensor. The acceleration sensor can be oriented here in the space in any desired way. For the determination of the state of motion of the vehicle, use is made of the knowledge that vibrations are characteristically representative of whether the vehicle is stationary or moving.

In one advantageous refinement, a raw vibration signal is determined as a function of the measurement signal by subtracting a DC component of the measurement signal from the measurement signal and as a function of the raw vibration signal. Tolerances of the acceleration sensor and the influence of the acceleration due to gravity and of other statistical measuring errors can be effectively corrected in this way. In addition, in this way it is possible to effectively correct quasi-static measuring influences, caused for example by temperature fluctuations.

According to a further advantageous refinement, a rectified raw vibration signal is determined as a function of the raw vibration signal by rectification, and the vibration signal is determined by a rectifier and as a function of the rectified raw vibration signal. This permits simultaneous evaluation of positive and negative acceleration components which are characteristic of the vibration of the vehicle.

In a further advantageous refinement, the vibration signal is determined as a function of low-pass filtering of the rectified raw vibration signal. This increases the informativeness of the respective state of motion of the vehicle as a result of the assumption that a change in state of a vehicle tends to follow a low-frequency process and relatively high frequency components of the rectified raw vibration signal are therefore filtered out.

According to a further advantageous refinement, it is determined whether the vehicle is stationary or whether the vehicle is moving as a function of a comparison of the vibration signal with a predefined upper threshold value and with a predefined lower threshold value. The use of two predefined threshold values permits, for example, the formation of a hysteresis, which results in more reliable information about the respective state of motion.

In a further advantageous refinement, as a function of the vibration signal it is concluded that the vehicle is moving when the predefined upper threshold value is exceeded, and it is concluded that the vehicle is stationary when the predefined lower threshold value is undershot. This permits reliable determination of the state of motion of the vehicle. In particular it is possible to effectively avoid a situation in which a moving state of motion is assigned to a stationary vehicle.

According to a further advantageous refinement, the predefined upper threshold value and the predefined lower threshold value are determined as a function of at least one GPS signal of a GPS module and/or a speed signal of a speed signal generator. This permits easy determination of the predefined upper threshold value and of the predefined lower threshold value.

In a further advantageous refinement, the predefined upper threshold value and/or the predefined lower threshold value are determined as a function of the reliability of the GPS signal and/or of the speed signal. This permits reliable determination of the predefined upper threshold value and of the predefined lower threshold value.

According to a further advantageous refinement, the DC component of the measurement signal is determined by forming an arithmetic mean of at least one sensed time period of the measurement signal. This permits cost-effective determination of the DC component, on the one hand, by virtue of the fact that the formation of the arithmetic mean requires, for example, little computing power compared to recursively operating statistical procedures. Dispensing with, for example, recursively operating procedures has, on the one hand, the advantage that a computer unit can in this way easily be interrupted and placed in a state of rest. This results in low energy consumption.

In a further advantageous refinement, at least one PT2 element is used in the low-pass filtering. This permits good damping of high oscillation components with 40 dB per decade.

BRIEF DESCRIPTION OF DRAWINGS

Exemplary embodiments of the invention are explained in more detail below with reference to the schematic drawings, in which:

FIGS. 4A to 4H show various signal profiles for the determination of the state of motion of the vehicle.

Elements with an identical design or function are characterized by the same reference symbols in all the figures.

DETAILED DESCRIPTION OF THE DRAWINGS

Figure 1:
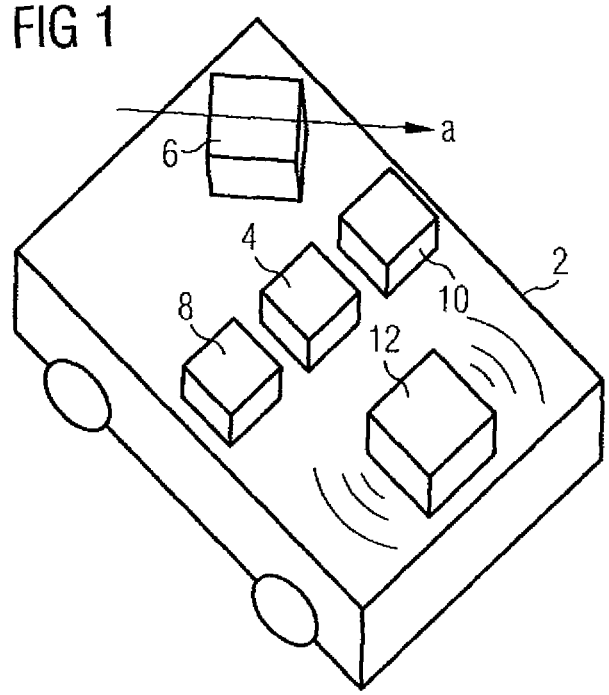
FIG. 1 is a vehicle with a control device, an acceleration sensor, a GPS module and a speed signal generator.

FIG. 1 shows a vehicle 2 with a control device 4 which can also be referred to as a device for determining a state of motion of a vehicle, an acceleration sensor 6, a speed signal generator 8 and a GPS module 10.

The vehicle 2 may be, for example, a motor vehicle. In particular, the vehicle 2 may be any type of utility vehicle, for example a bus, a cement mixer, a refrigerated truck or some other type of utility vehicle which is known to a relevant person skilled in the art.

The vehicle 2 may have one or more noise sources 12 that can cause the vehicle 2 to vibrate even when it is in a stationary vehicle state. The noise source 12 may be, for example, a refrigeration unit, a device for mixing cement, a loading device or any other type of device which emits vibrations.

The acceleration sensor 6 is designed to determine an axial acceleration a. The acceleration sensor 6 may be oriented in any desired way in the space since the method proposed is not dependent on a preferred direction of the axial acceleration a that is determined.

The control device 6 is designed to determine a state of motion of a vehicle 2 as a function of the axial acceleration a that is sensed by the acceleration sensor 6. For the determination of the state of motion of the vehicle 2, components of the axial acceleration a that are representative of vibrations of the vehicle 2 are taken into account. The knowledge is used that the vibrations of the vehicle 2 in the stationary state differ from the vibrations during travel. It is to be taken into account here that evaluation of the vibrations that are characteristic of the state of motion can be made more difficult as a result of superimposition of vibrations that originate from the noise source 12 of the vehicle 2. Taking into account the vibrations of the vehicle 2 permits the state of motion of the vehicle 2 to be determined as a function of just the acceleration sensor 6.

The acceleration sensor 6, the speed signal generator 8 and the GPS module 10 are assigned to the control device 4. Via the acceleration sensor 6 the control device 4 obtains a signal for sensing the axial acceleration a. The control device 4 receives a GPS signal GPS_S via the GPS module 10. The GPS signal GPS_S is, for example, a vehicle speed, an orientation of the vehicle 2 and/or a spatial position of the vehicle 2. The speed signal generator 8 transmits a speed signal G_S to the control device 4. This may relate, for example, to the longitudinal speed of the vehicle 2. The speed signal generator 8 determines the speed signal G_S as a function of wheel speeds of the vehicle 2, for example. If the speed signal G_S and/or the GPS signal GPS_S can be reliably determined, the state of motion of the vehicle 2 can be determined easily and precisely as a function of the speed signal G_S and/or the GPS signal GPS_S. However, it is assumed that the speed signal G_S and/or the GPS signal GPS_S cannot always be reliably determined.

If the state of motion of the vehicle 2 cannot be determined by the speed signal G_S and/or the GPS signal GPS_S, the state of motion of the vehicle 2 can be determined as a function of the recorded sensor data of the acceleration sensor 6 by an evaluation by the control device 4.

Figure 2:
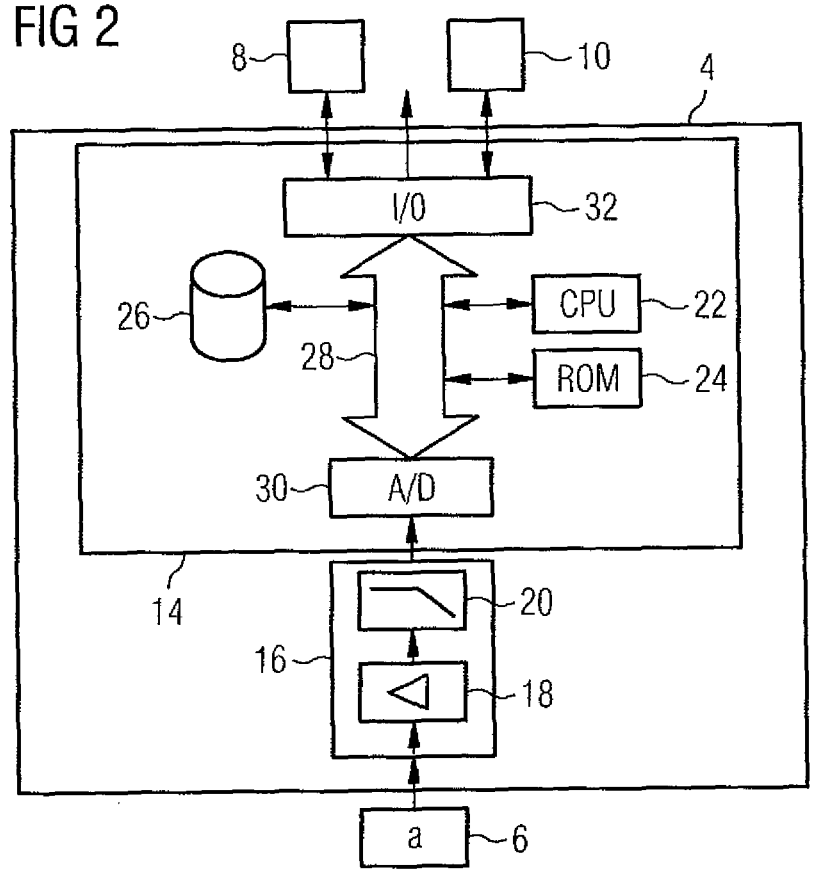
FIG. 2 is the control device, the acceleration sensor, the GPS module and the speed signal generator.

FIG. 2 shows the control device 4, the acceleration sensor 6, the speed signal generator 8 and the GPS module 10. The acceleration sensor 6, the speed signal generator 8 and the GPS module 10 are assigned to the control device 4 and exchange signals with the control device 4. The control device 4 comprises a computing unit 14 and an analog module 16. The analog module 16 has an amplifier 18 and a low pass filter 20. The amplifier 18 is designed to sense the axial acceleration a of the acceleration sensor 6 and pass it on to the low pass filter 20.

The computing unit 14 comprises a processor 22, a program memory 24, and a data memory 26. The processor 22, the program memory 24 and the data memory 26 are coupled to one another via a system bus 28.

The computing unit 14 of the control device 4 is designed to execute a program which is stored, for example, in the program memory 24. The state of motion of the vehicle 2 can be determined by the program. The data memory 26 is designed to store data, for example signals.

The system bus 28 is coupled to an analog/digital converter 30. The signals that are conditioned in an analog fashion by the analog module 16 are digitized by the analog/digital converter 30 and made available via the system bus 28 to the processor 22 and to the data memory 26 for further processing. The control device 4 is coupled to the speed signal generator 8 and the GPS module 10 via an interface 32. The GPS signal GPS_S and the speed signal G_S which are read in, for example, via the interface 32 can be passed on via the system bus 28 to the processor 22 or to the data memory 26.

Figure 3:
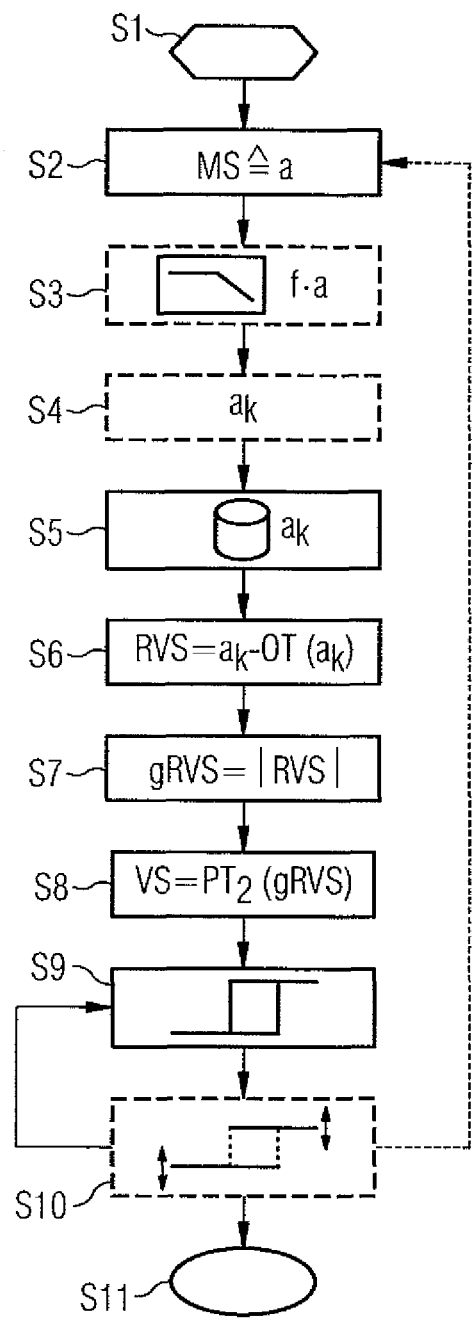
FIG. 3 is a flowchart for the determination of a state of motion of the vehicle.

FIG. 3 is a flowchart such as can be executed, for example, in the program stored in the program memory 24. The program starts in a first program step S1. In a second program step S2, a measurement signal MS is acquired by the acceleration sensor 6 and read in by the control device 4.

A third program step S3 is optional. The measurement signal MS can be conditioned by the analog module 16. For example, the measurement signal MS can be amplified by a factor f by the amplifier 18 and subsequently filtered by the low pass filter 20.

Subsequent further processing of the measurement signal MS preferably takes place in a digital fashion. In this case, the measurement signal MS is digitized in a fourth program step S4 by the analog/digital converter 30. However, it is, for example, also conceivable to carry out the method in an analog fashion. In such a case, the digitization of the measurement signal in the program step S4 is omitted.

Figure 4A:
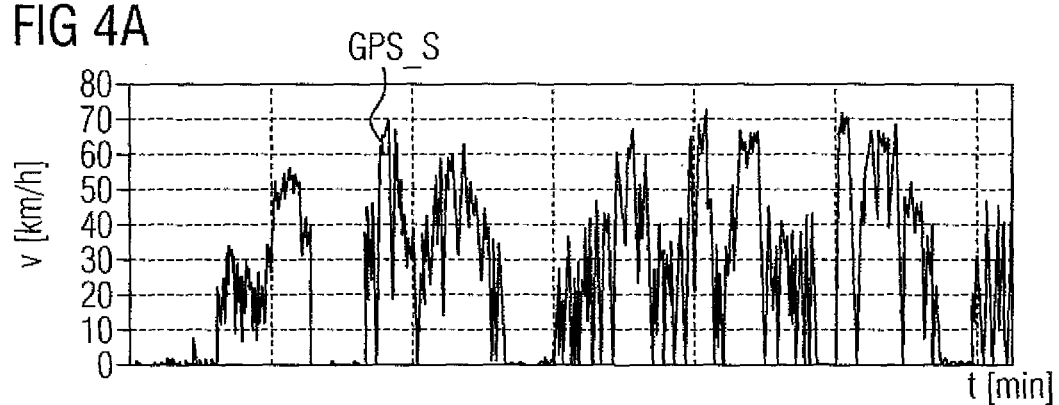
Figure 4B:
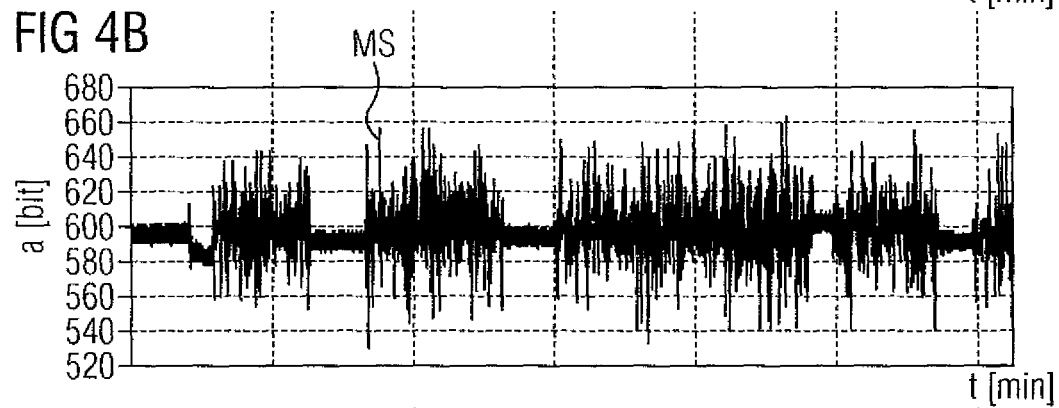

FIG. 4B shows a measurement signal MS that is sensed by the acceleration sensor 6 and digitized by the control device 4, over a time period of approximately 120 minutes. For the purpose of comparison, FIG. 4A shows the speed of the vehicle 2 in km/h, such as was determined, for example, as a function of the GPS signal GPS_S.

In a fifth program step S5, at least one time period of the measurement signal MS is recorded. The time period of the measurement signal MS can, for example, be stored in a digital fashion, for example by the data memory 26.

Figure 4C:
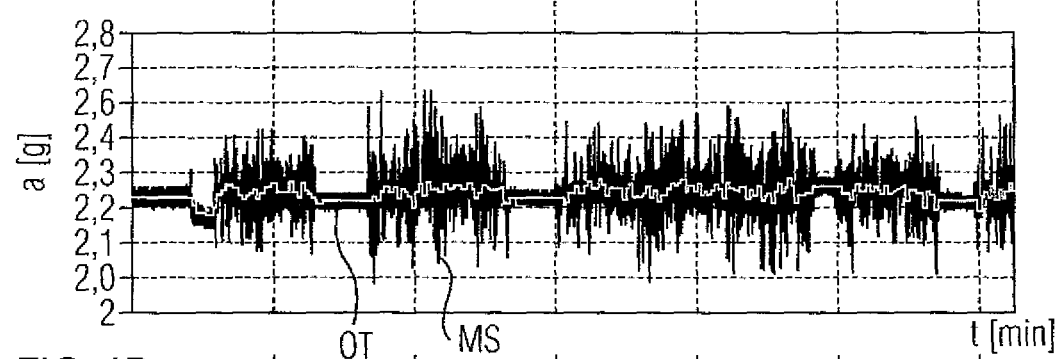
Figure 4D:
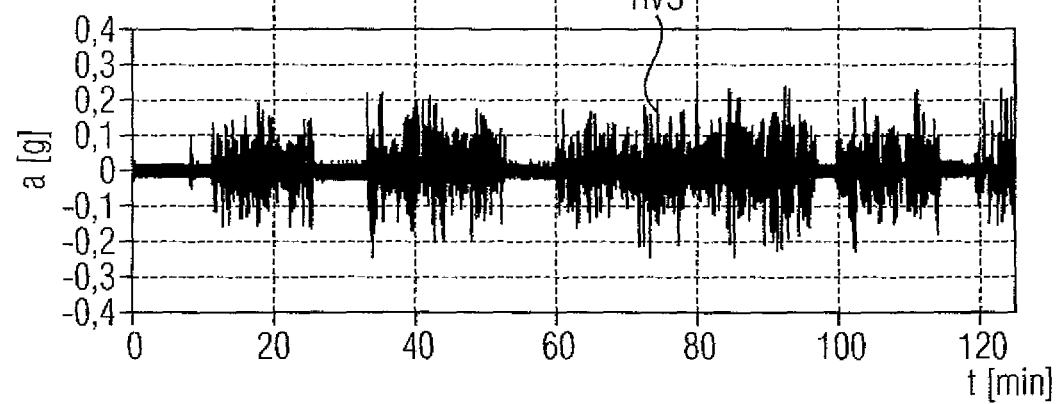

In a sixth program step S6, a DC component OT of the measurement signal MS is firstly determined, and the measurement signal MS is then corrected by an amount equivalent to the DC component OT. The DC component OT of the measurement signal MS is preferably determined by the arithmetic mean of the time period, respectively stored in the program step S5, of the measurement signal MS. FIG. 4C shows the measurement signal MS as a function of acceleration due to gravity g and its DC component OT plotted over the time period of approximately 120 minutes. By subtracting the DC component OT from the measurement signal MS, a raw vibration signal RVS is formed, such as is illustrated, for example, in FIG. 4D as a function of the acceleration due to gravity g.

In a seventh program step S7, a rectified raw vibration signal gRVS is formed by rectifying the raw vibration signal RVS. The rectification of the raw vibration signal RVS comprises, for example, formation of absolute values of the raw vibration signal RVS. The rectified raw vibration signal gRVS is represented in FIG. 4E as a function of the acceleration due to gravity g over the time period of approximately 120 minutes.

In an eighth program step S8, a vibration signal VS is determined by low pass filtering of the rectified raw vibration signal gRVS. In one preferred embodiment, the low pass filtering of the rectified raw vibration signal gRVS comprises filtering by a PT2 element. In the program step S8, the vibration signal VS, which is representative of vibrations of the vehicle 2, is obtained as a function of the axial acceleration a, which is sensed by the acceleration sensor 6.

In a ninth program step S9, it is determined, as a function of the vibration signal VS and at least one predefined threshold value, whether the vehicle 2 is stationary or whether the vehicle 2 is moving. The state of motion of the vehicle 2 is preferably determined as a function of an upper threshold value OS and a lower threshold value US. FIG. 4F shows the vibration signal VS with an amplitude AMP, the upper threshold value OS and the lower threshold value US plotted over the time period of approximately 120 minutes.

FIG. 4H illustrates an assignment of the respective state of motion of the vehicle 2 to a respective time. A state of motion STATE0 is assigned to the stationary vehicle 2. A state of motion STATE1 is assigned to the moving vehicle 2. If neither of the two states of motion can be assigned to the vehicle 2, a nondefined state of motion ND is assigned to the vehicle. FIG. 4G shows once more the speed of the vehicle 2 in km/h, this time as a function of the speed signal G_S, for the purpose of comparison in this respect. The upper threshold value OS is preferably initialized with a value that is high relative to the amplitude AMP of the vibration signal VS, and the lower threshold value US is preferably initialized with a value that is low relative to the amplitude AMP of the vibration signal VS. After the ninth program step S9 has been executed, the program can end in an eleventh program step S11.

The program which is carried out by the control device 4 is preferably continued in a tenth program step S10 after the ninth program step S9. In the tenth program step S10, the upper threshold value OS and/or the lower threshold value US are adapted.

Adapting the upper threshold value OS and/or the lower threshold value US has the advantage that it is possible to take into account a change in the vibration signal VS on the basis of, for example, a changed operating mode of the vehicle 2. In particular in the case of utility vehicles, the vibration signal VS can change greatly as a function of a respective use. For example, the vibration signal VS of a dumper truck which is moving on a construction site differs significantly from the vibration signal VS of the dumper truck during free flowing travel on a freeway.

The adaptation is preferably carried out here as follows:

If the stationary state of motion STATE0 is assigned to the vehicle 2 and the amplitude AMP of the vibration signal VS is higher than the lower threshold value US, the value of the amplitude AMP of the vibration signal VS is assigned to the lower threshold value US. If the moving state of motion STATE1 is assigned to the vehicle 2 and the amplitude AMP of the vibration signal VS is lower than the upper threshold value OS, the value of the amplitude AMP of the vibration signal VS is assigned to the upper threshold value OS.

Both the upper threshold value OS and the lower threshold value US are preferably corrected in the direction of their initial values after the expiry of a predefined time period. The predefined time period is, for example, several hours, a few days, or a few weeks.

The upper threshold value OS is preferably predefined in such a way that the moving state of motion STATE1 is not incorrectly assigned to the stationary vehicle 2. For this purpose, an interval d (FIG. 4F) between the lower threshold value US and the upper threshold value OS is preferably determined after each adaptation. If the interval d is smaller than a minimum interval d_min, the upper threshold value OS is adapted in such a way that the sum of the lower threshold value US and of the minimum interval d_min is assigned thereto. This sum can avoid an error during the determination of the state of motion in the event, for example, of strong vibrations in the stationary state of motion STATE0.

A delay time, for example a delay time of several minutes, is preferably taken into account during adaptation of the upper threshold value OS and/or of the lower threshold value US. This ensures that the vibration signal VS has reliably adopted a steady state after a change of the state of motion of the vehicle 2 before the adaptation is performed.

If the speed signal G_S or the GPS signal GPS_S have been reliably received, the upper threshold value OS and/or the lower threshold value US are preferably adapted as a function of the speed signal G_S and/or the GPS signal GPS_S.

After the tenth program step S10 has been executed, the program can continue with the ninth program step S9 in order to determine the state of motion of the vehicle 2 anew. However, it is also possible that after the expiry of the tenth program step S10, the program continues with the second program step S2 and a measurement signal MS is determined anew by the acceleration sensor 6 as a function of the axial acceleration a. After the execution of the tenth program step S10, the program can be ended in the eleventh program step S11.

Since the program steps S1 to S11 which are executed by the program do not constitute any complicated processing steps, the entire control device 4 can be configured in a very cost-effective fashion. This applies in particular also with respect to the energy consumption by the control device 4. This permits, for example, autonomous operation of the control device 4 over a long time period by its own energy source.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining a state of motion of a vehicle based on information relating to only a single axis of only one single axis acceleration sensor, comprising:

determining a vibration signal representative of vibrations of the vehicle based only on an axial acceleration, wherein the axial acceleration is determined to be an acceleration along an axis oblique to the direction of travel, and wherein the axial acceleration is determined from a measurement signal output by the only one single axis acceleration sensor measuring the single axis;

determining at least one of a predefined upper threshold value and a predefined lower threshold value as a function of at least one of a GPS signal of a GPS module and a speed signal of a speed signal generator;

comparing the vibration signal with the predefined upper threshold value and with the predefined lower threshold value; and determining whether the vehicle is stationary or whether the vehicle is moving as a function of the comparison of the vibration signal with the predefined upper threshold value and with the predefined lower threshold value, wherein the single axis is oblique to a direction of travel of the vehicle.

2. The method as claimed in claim 1, wherein a raw vibration signal is determined as a function of the measurement signal by subtracting a DC component of the measurement signal from the measurement signal and as a function of the raw vibration signal.

3. The method as claimed in claim 2, wherein a rectified raw vibration signal is determined as a function of the raw vibration signal by rectification, and the vibration signal is determined by a rectifier and as a function of the rectified raw vibration signal.

4. The method as claimed in claim 3, wherein the vibration signal is determined as a function of low-pass filtering of the rectified raw vibration signal.

5. The method as claimed in claim 2, wherein the vibration signal is determined as a function of low-pass filtering of the rectified raw vibration signal.

6. The method as claimed in claim 5, wherein at least one PT2 element is used in the low pass filtering.

7. The method as claimed in claim 2, wherein the DC component of the measurement signal is determined by forming an arithmetic mean of at least one sensed time period of the measurement signal.

8. The method as claimed in claim 1, wherein as a function of the vibration signal it is concluded that the vehicle is moving when the predefined upper threshold value is exceeded, and it is concluded that the vehicle is stationary when the predefined lower threshold value is undershot.

9. The method as claimed in claim 1, wherein at least one of the predefined upper threshold value and the predefined lower threshold value are determined as a function of at least one of a reliability of the GPS signal and a reliability of the speed signal.

10. A device for determining a state of motion of a vehicle based on information relating to only a single axis of only one single axis acceleration sensor, the device comprising:

an input configured to receive acceleration data relating to the single axis from the single acceleration sensor; and a processor configured to:

determine a vibration signal that is representative of the vibrations of the vehicle based only on an axial acceleration, wherein the axial acceleration is determined to be an acceleration along an axis oblique to the direction of travel, and wherein the axial acceleration is determined from a measurement signal output by the only one single axis acceleration sensor measuring the single axis;

determine at least one of a predefined upper threshold value and a predefined lower threshold value as a function of at least one of a GPS signal of a GPS module and a speed signal of a speed signal generator; and determine, as a function of a comparison of the vibration signal with the predefined upper threshold value and with the predefined lower threshold value, whether the vehicle is stationary or whether the vehicle is moving, wherein the single axis is oblique to a direction of travel of the vehicle.

* * * * *